United States Patent
Bardini

(10) Patent No.: US 12,415,643 B2
(45) Date of Patent: Sep. 16, 2025

(54) LABELING ASSEMBLY FOR LABELING MACHINES

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 0 days.

(21) Appl. No.: 18/690,877

(22) PCT Filed: Aug. 30, 2022

(86) PCT No.: PCT/EP2022/074077
§ 371 (c)(1),
(2) Date: Mar. 11, 2024

(87) PCT Pub. No.: WO2023/041320
PCT Pub. Date: Mar. 23, 2023

(65) Prior Publication Data
US 2024/0391633 A1   Nov. 28, 2024

(30) Foreign Application Priority Data
Sep. 14, 2021   (IT) .................. 102021000023624

(51) Int. Cl.
*B65C 9/40* (2006.01)
*F16P 1/02* (2006.01)
*F16P 3/08* (2006.01)

(52) U.S. Cl.
CPC ............. *B65C 9/40* (2013.01); *F16P 1/02* (2013.01); *F16P 3/08* (2013.01)

(58) Field of Classification Search
CPC ................. B65C 9/40; F16P 3/08; F16P 1/02
See application file for complete search history.

(56) References Cited

U.S. PATENT DOCUMENTS

2009/0145030 A1* 6/2009 Landerer ............ B23Q 11/0833
49/41
2014/0306391 A1* 10/2014 Eichhammer ............ B65C 9/40
269/57

(Continued)

FOREIGN PATENT DOCUMENTS

WO   2017/093392 A1   6/2017
WO   2019/228890 A1   12/2019

OTHER PUBLICATIONS

European Patent Office, International Search Report and Written Opinion issued Feb. 2, 2023, which pertains to PCT Application No. PCT/EP2022/074077. 7 pages.

*Primary Examiner* — Daniel D Yabut
(74) *Attorney, Agent, or Firm* — THOMPSON HINE LLP

(57) ABSTRACT

A labeling assembly for labeling machines, which includes a base framework adapted to be associated with a conveyor of containers to be labeled and supporting, at a work area), elements for labeling the containers. At least one protection of the work area supported by the base framework is provided; the protection can be moved on command, with respect to the base framework, between an active condition, in which the protection is adapted to delimit at least partially the work area, and at least one inactive condition, in which the protection is arranged at least partially outside the portion of space that lies vertically above the work area, in order to allow access to the work area from outside.

5 Claims, 12 Drawing Sheets

(56) References Cited

U.S. PATENT DOCUMENTS

| | | | | |
|---|---|---|---|---|
| 2014/0373674 | A1* | 12/2014 | Stoiber | B65C 9/40 74/612 |
| 2018/0354670 | A1* | 12/2018 | Schinelli | F16P 3/08 |
| 2021/0206528 | A1* | 7/2021 | Bonardi | B65C 9/02 |
| 2021/0394946 | A1* | 12/2021 | Merrill | B65C 9/02 |

* cited by examiner

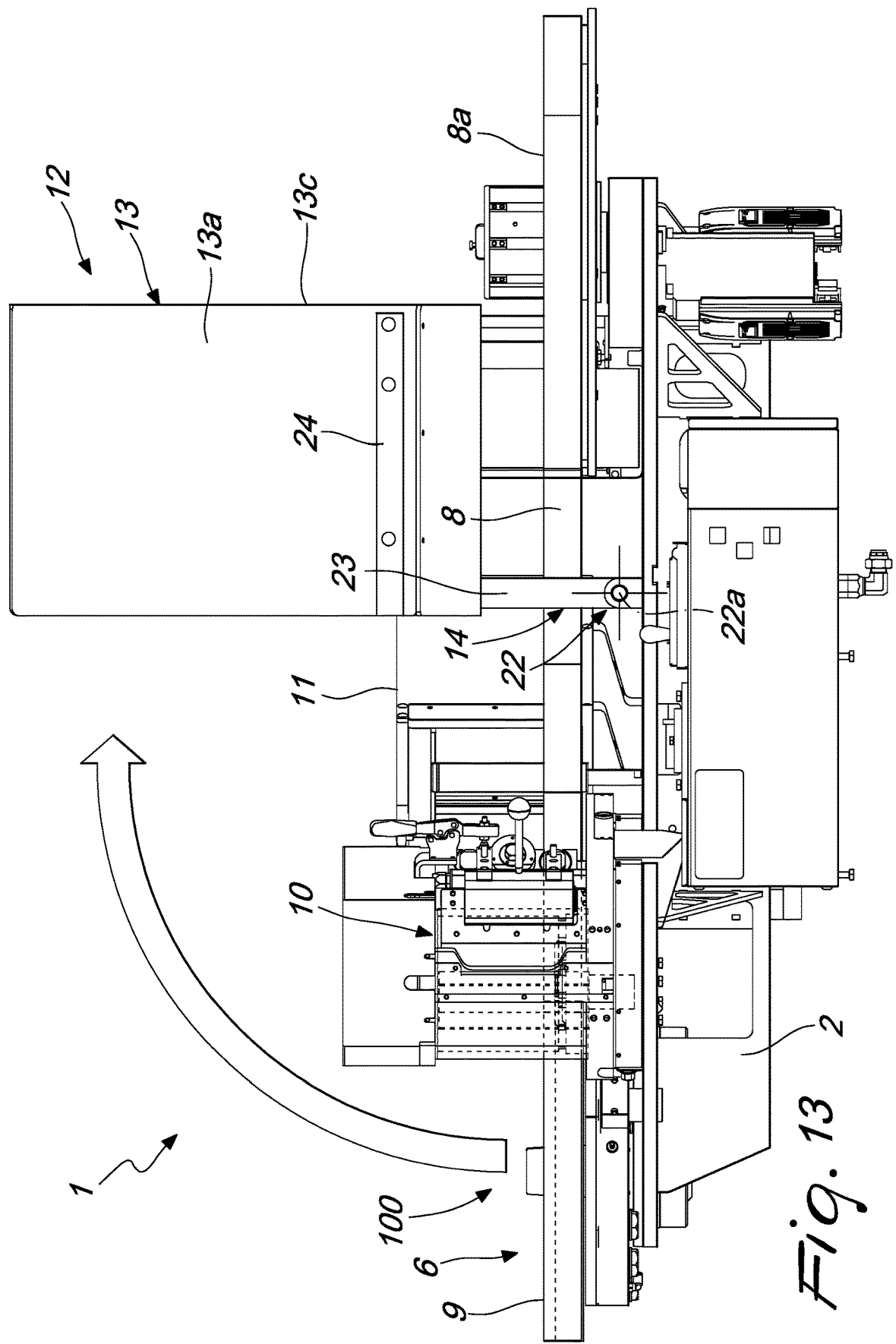

LABELING ASSEMBLY FOR LABELING MACHINES

The present invention relates to a labeling assembly for labeling machines.

Labeling machines are known which allow to apply to containers, such as bottles, flacons or the like, labels which are taken from a medium or a magazine label magazine or are obtained by cutting from a label ribbon and on which multiple labels are printed in mutual succession, said ribbon being rolled around in a role.

Typically, these machines have a conveyor which allows to cause the advancement of the containers to be labeled along an advancements path and is normally constituted by a rotating carousel provided, at its peripheral region, with supporting plates for individual containers to be labeled, which can rotate so as to turn the containers about the respective axes.

Furthermore, at least one labeling assembly is arranged around the carousel and usually comprises a base framework, which can be coupled stably or detachably to the fixed framework of the carousel and supports, at a work region directed toward the carousel, labeling means which allow to apply the labels to the containers that arrive from the carousel.

The labeling means are constituted by elements that move during the operation of the machine and typically comprise at least one rotating drum designed to make the labels adhere to the containers.

More particularly, in labeling machines that process spools of label ribbons, the labeling means normally comprise an unwinding unit, constituted by a pair of oppositely rotating rollers, which has the function of picking up the label ribbon from the corresponding spool to feed it to a rotatable cutting roller, which allows to cut the individual labels and to subsequently transfer them to a transfer drum, which can rotate about its own axis, in order to transfer the individual cut labels to the respective containers.

In other types of labeling machine, at the output of the unwinding unit the label ribbon is fed directly to a cutting and transfer drum, which is provided peripherally with means for cutting the label ribbon so that it can cut the label ribbon and subsequently transfer the labels obtained after cutting to the containers that arrive from the carousel.

The label ribbon may be provided with bands of glue which are pre-applied to the leading and trailing ends of the individual labels or may be without glue and in this case in the work area of the labeling assembly, laterally to the transfer or cutting and transfer drum, there are means for applying the adhesive, typically constituted by a glue roller.

In order to avoid risks of contact of the operators with the moving elements of its work area, the labeling assembly is provided with protections which allow to delimit the most dangerous parts of the labeling assembly, preventing them from being reachable during the operation of the machine.

For compliance with standards, the work area with the corresponding moving elements is protected in an upper region as well, with protections which extend also above the work area or in any case the work area is delimited laterally with protections that are high enough that they cannot be climbed over by operators.

More particularly, in known solutions the protections are constituted by a plurality of substantially vertical protection panels, which are mounted on the supporting framework of the labeling assembly, around the labeling means, so as to delimit perimetrically their work area.

In order to allow the operators to perform maintenance or repair or format changing interventions on the labeling means, the protection panels can be removed individually from the base framework of the labeling assembly and rested on the ground but hinder the free movement of the operators.

Solutions are also known in which the protection panels are individually hinged, along a vertical edge thereof, to the base framework, so that they can pass from a closed condition, in which they delimit laterally the space around the labeling means, to an open condition, in which they allow the operators to access the labeling means, and vice versa.

In this case also, however, the protection panels can constitute a hindrance to the freedom of movement of the operators, especially in the region in which they are hinged to the base framework.

A further solution has also been proposed in which the protection of the work area of the labeling assembly is constituted by a protection body which is mounted on the base framework of the labeling assembly with the possibility to be moved slidingly along a vertical direction between a lowered active position, in which it is closer to the base framework, so as to protect the work area of the labeling means, and a raised inactive position, in which it is spaced vertically from the base framework, so as to allow the possibility of access from outside to the work area of the labeling means.

Although this solution is better than the preceding ones, it is not fully satisfactory, since for the maintenance of the labeling means it is generally necessary to intervene from above, and therefore the protection body, even when it is in the raised inactive position, is often a hindrance for the operators.

The aim of the present invention is to provide a labeling assembly for labeling machines that is capable of improving the background art in one or more of the aspects indicated above.

Within this aim, an object of the invention is to provide a labeling assembly for labeling machines that offers high assurances of protection of the operators during the operation of the machine and allows, during interventions for mentions, repair, format changing and so forth, convenient access to the work area in which the labeling means are present, without hindrances for the operators.

Another object of the invention is to provide a labeling assembly for labeling machines that is practical and easy to use for the operators.

A further object of the present invention is to overcome the drawbacks of the background art in a manner that is alternative to any existing solutions.

Another object of the invention is to provide a labeling assembly for labeling machines that is highly reliable and relatively easy to provide, so that it can be manufactured at competitive costs.

This aim, as well as these and other objects which will become better apparent hereinafter, are achieved by a labeling assembly for labeling machines according to claim 1, optionally provided with one or more of the characteristics of the dependent claims.

Further characteristics and advantages of the invention will become better apparent from the description of preferred but not exclusive embodiments of the labeling assembly for labeling machines according to the invention, illustrated by way of non-limiting example in the accompanying drawings, wherein:

FIG. 13 is a lateral elevation view of the embodiment of the labeling assembly according to the invention, with the protection in the inactive condition.

Figure 1:
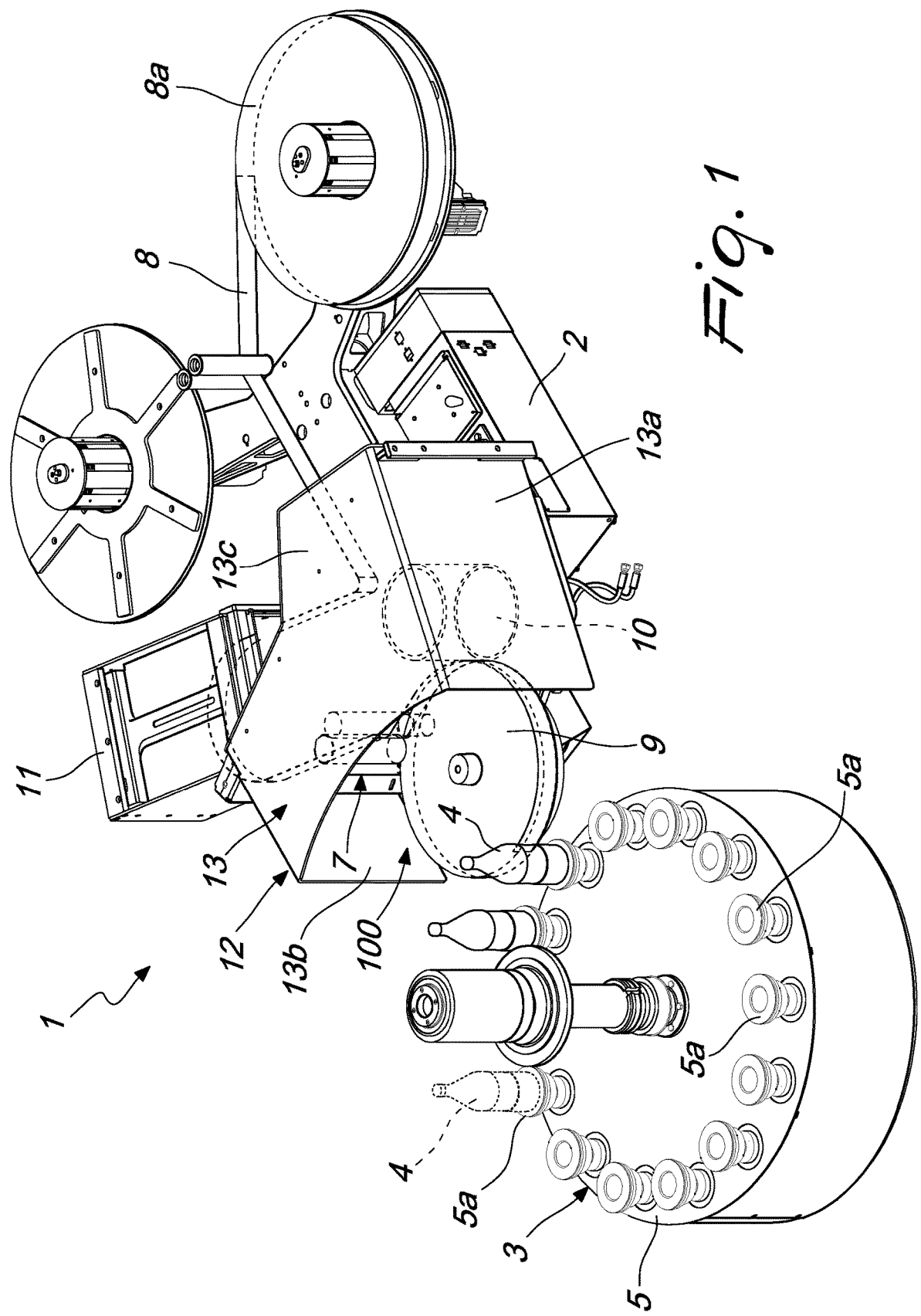
FIG. 1 is a perspective view of a labeling assembly according to the invention, associated with a conveyor of the containers with a protection of the work area of labeling means in the active condition.

With reference to the figures, the labeling assembly for labeling machines according to the invention, designated generally by the reference numeral 1, comprises a base framework 2 which is structured so that it can be associated with a conveyor 3 of containers 4 to be labeled, which is advantageously constituted by a carousel 5, provided peripherally with 20 plates 5a for supporting the individual containers 4.

It should be noted that the base framework 2 can be fixed stably to the fixed structure of the conveyor 3 or can be connected detachably to the fixed structure of the conveyor 3, and in this case is conveniently associated with a conveyance carriage, not shown.

The base framework 2 supports, at a work area 100, labeling means 6 which allow to apply the labels to the containers 4 that transit on the conveyor 3.

In particular, the labeling means 6 at least have, at the work area 100, an unwinding unit 7 constituted for example by a pair of oppositely rotating rollers, which allows to pick up a label ribbon 8 from at least one respective spool 8a, a transfer drum 9, which faces the conveyor 3 and allows to apply the labels obtained by cutting the label ribbon 8 to the containers 4, and optionally, if the label ribbon 8 is without adhesive, a glue roller 10, which is designed to apply adhesive to the labels and is arranged laterally to the transfer drum 9.

Conveniently, as per se known, a device 11 for tensioning the label ribbon 8 is provided between the unwinding unit 7 and the spools 8a, 8b and generally remains outside the actual work area 100.

According to another example, which is not shown, the labeling means 6 may also comprise a magazine for the already-cut labels, a device for picking up the labels from the magazine and a device for applying the labels to the containers 4, which are per se known.

Furthermore, at least one protection 12 is provided on the labeling assembly that allows to protect at least one part of the work area 100 and is supported by the base framework 2 or is in any case connected thereto.

More particularly, the protection 12 conveniently comprises at least one protection body 13, which preferably has a substantially box-like structure and allows to delimit at least partially the work area 100 in which the labeling means 6 operate, in order to prevent access at least to said part of the work area 100, in particular when the labeling means 6 are in operation.

Figure 5:
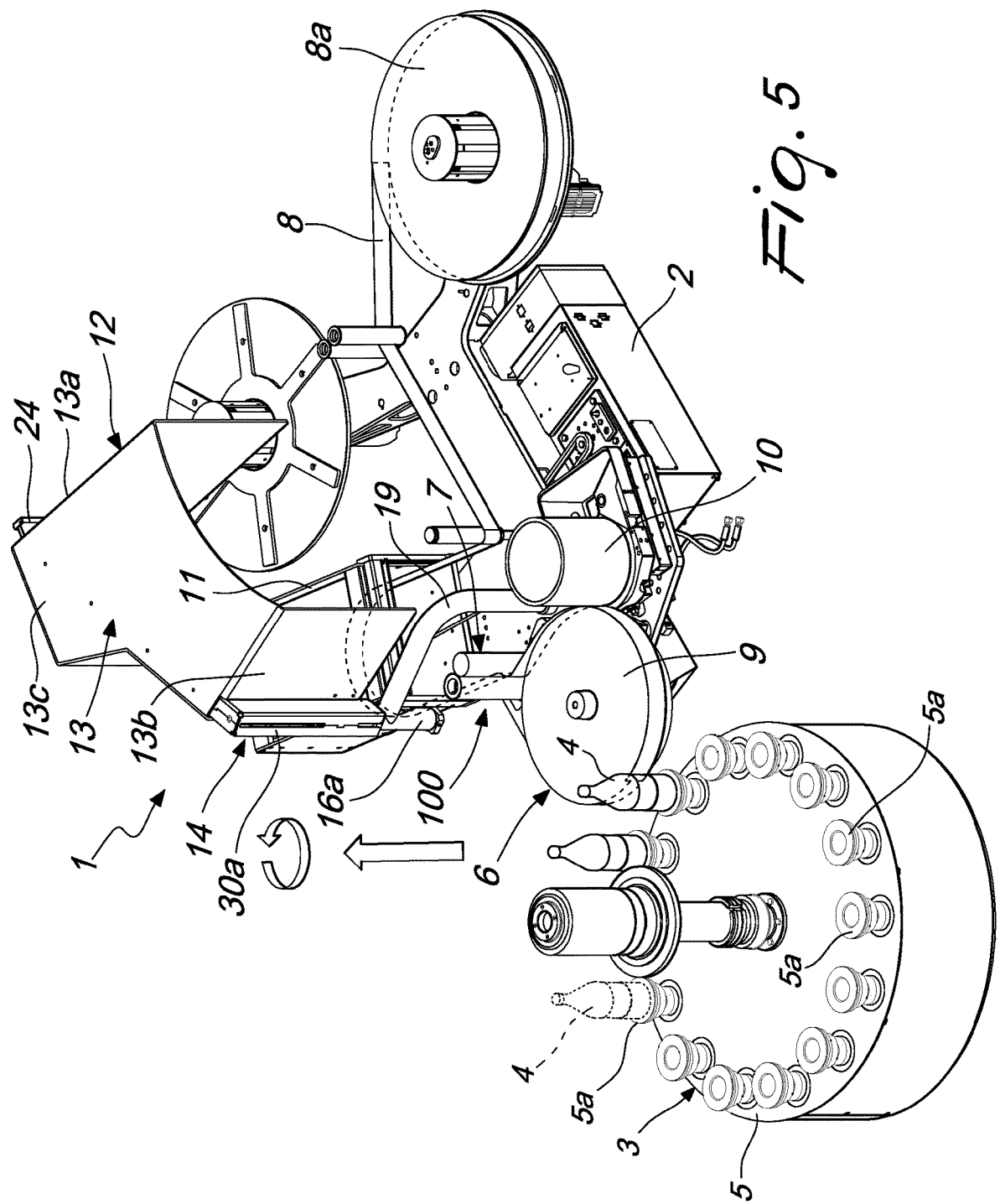
FIG. 5 is a perspective view of the labeling assembly according to the invention associated with the container conveyor with the protection in the inactive condition.

The protection 12 can move on command, with respect to the base framework 2, between an active condition, which can be assumed during the operation of the machine and is visible, for example, in FIG. 1, in which the protection 12 is adapted to delimit at least partially the work area 100 and in particular at least the region where the unwinding unit 7, the transfer drum 9 and the glue roller 10, if present, operate, and at least one inactive condition, which can be assumed when interventions of the operators on the labeling means 6 are required and which is shown for example in FIG. 5, in which the protection 12 is arranged at least partially outside the portion of space that extends vertically above the work area 100.

In this manner, the protection 12, when in the inactive condition, allows the operators access from outside to the work area 100, leaving free also the part of space that is above the work area 100, so that it does not hinder the operations that require an intervention from above on the labeling means 6 on the part of the operators.

Figure 6:
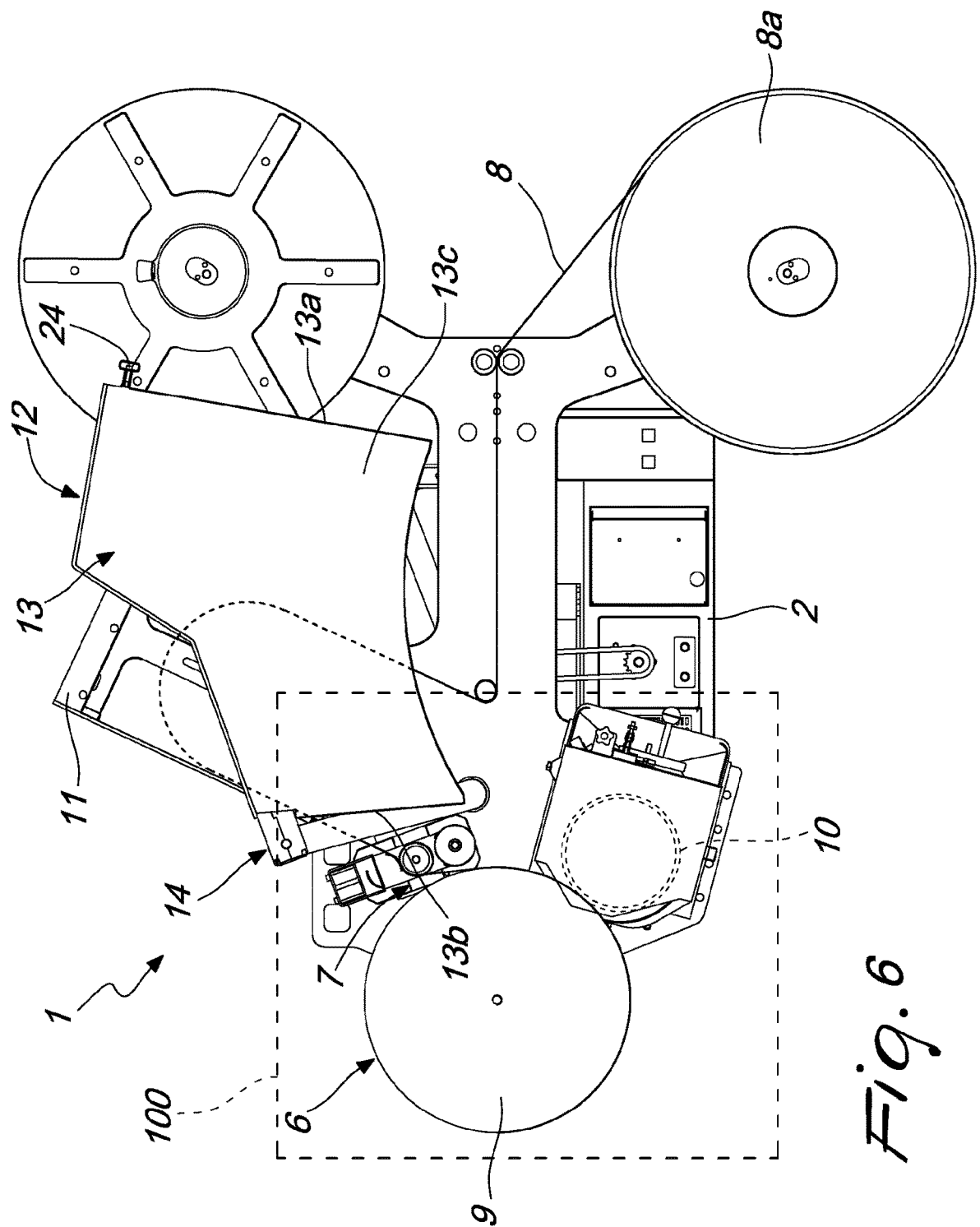
FIG. 6 is a top plan view of the labeling assembly according to the invention with the protection in the inactive condition.
Figure 7:
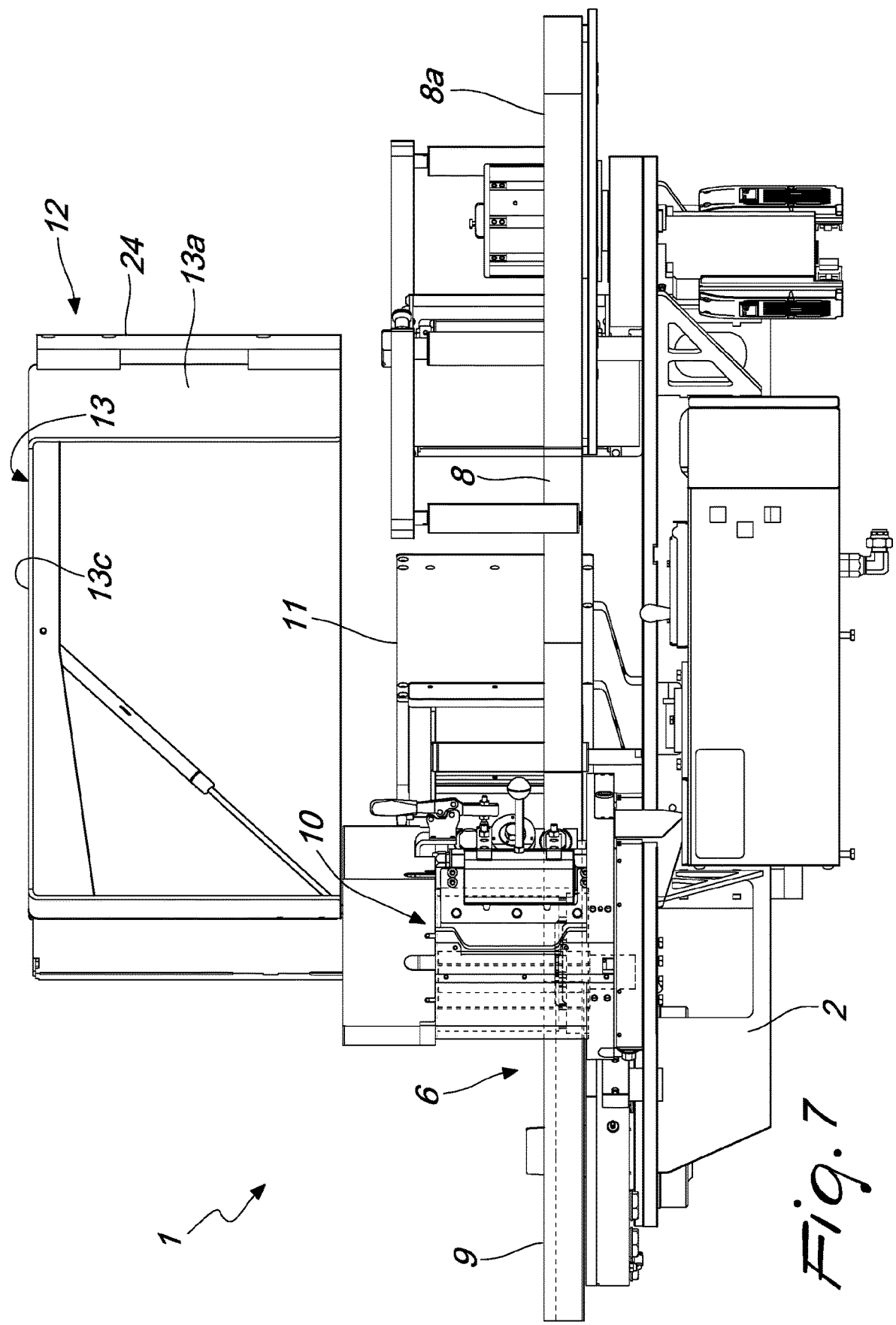
FIG. 7 is a side view of the labeling assembly according to the invention with the protection in the inactive condition.
Figure 8:
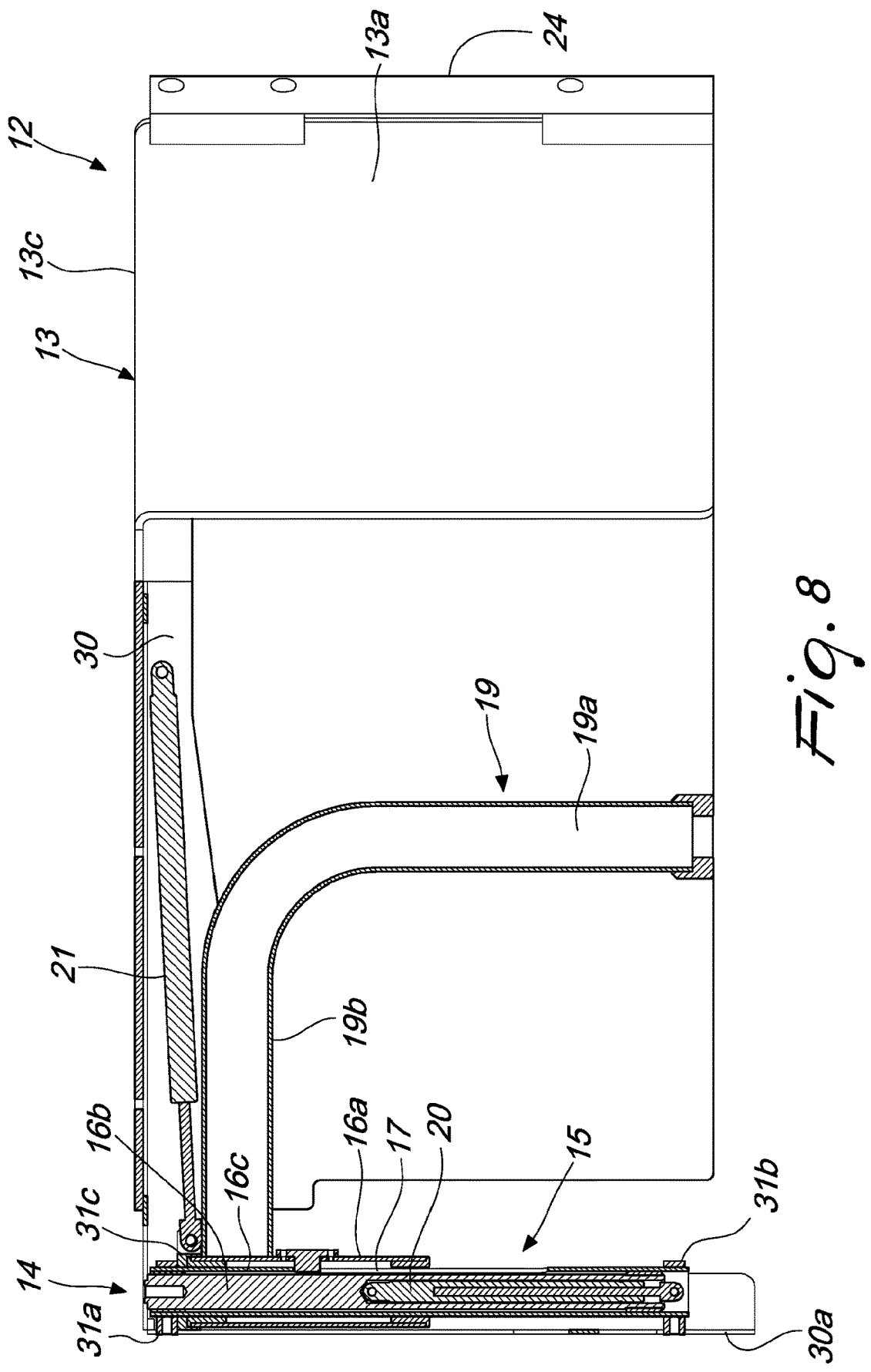
FIG. 8 is a partially sectional lateral elevation view of the protection in a lowered position assumed when it is in the active condition.
Figure 9:
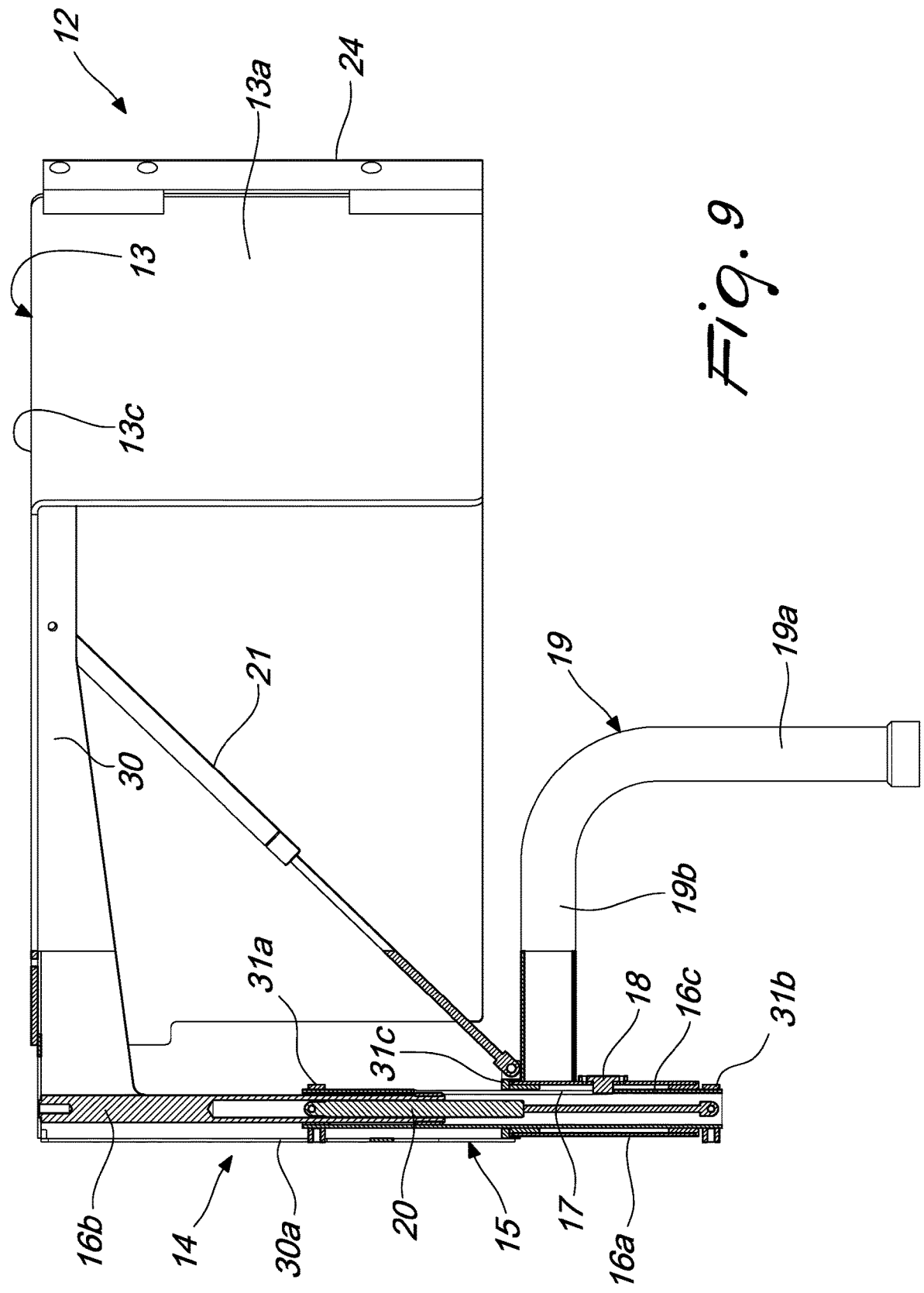
FIG. 9 is a partially sectional lateral elevation view of the protection in the raised position.

Merely by way of example, the area that can be considered the work area 100 is shown in broken lines in FIG. 6.

Advantageously, the protection body 13 that constitutes the protection 12 has at least two lateral production walls 13a, 13b, which are mutually opposite and are structured so as to delimit respective mutually opposite sides of the work area 100 when the protection 12 is in the active condition.

Preferably, the protection body 13 furthermore has at least one upper closure wall 13c, which, with the protection 12 in the active condition, allows to delimit in an upper region the work area 100, so as to prevent the operators from being able to access the work area 100 from above during the operation of the machine.

It should be noted that conveniently the protection body 12 is open on its side designed to be directed toward the conveyor 3 when the protection 12 is in the active condition, and is provided with openings to allow the passage of the label ribbon 8 from the spools 8a, 8b to the work area 100, again when the protection 12 is in the active condition.

In detail, the protection 12 is mounted on the base framework 2 by virtue of movement means 14, which allow its movement between the active condition and said inactive condition.

According to one possible embodiment, the movement means 14 are structured to allow the transition of the protection 12 from the active condition to the inactive condition by means of a translation along a substantially vertical direction and a subsequent rotation about a substantially vertical axis.

Figure 2:
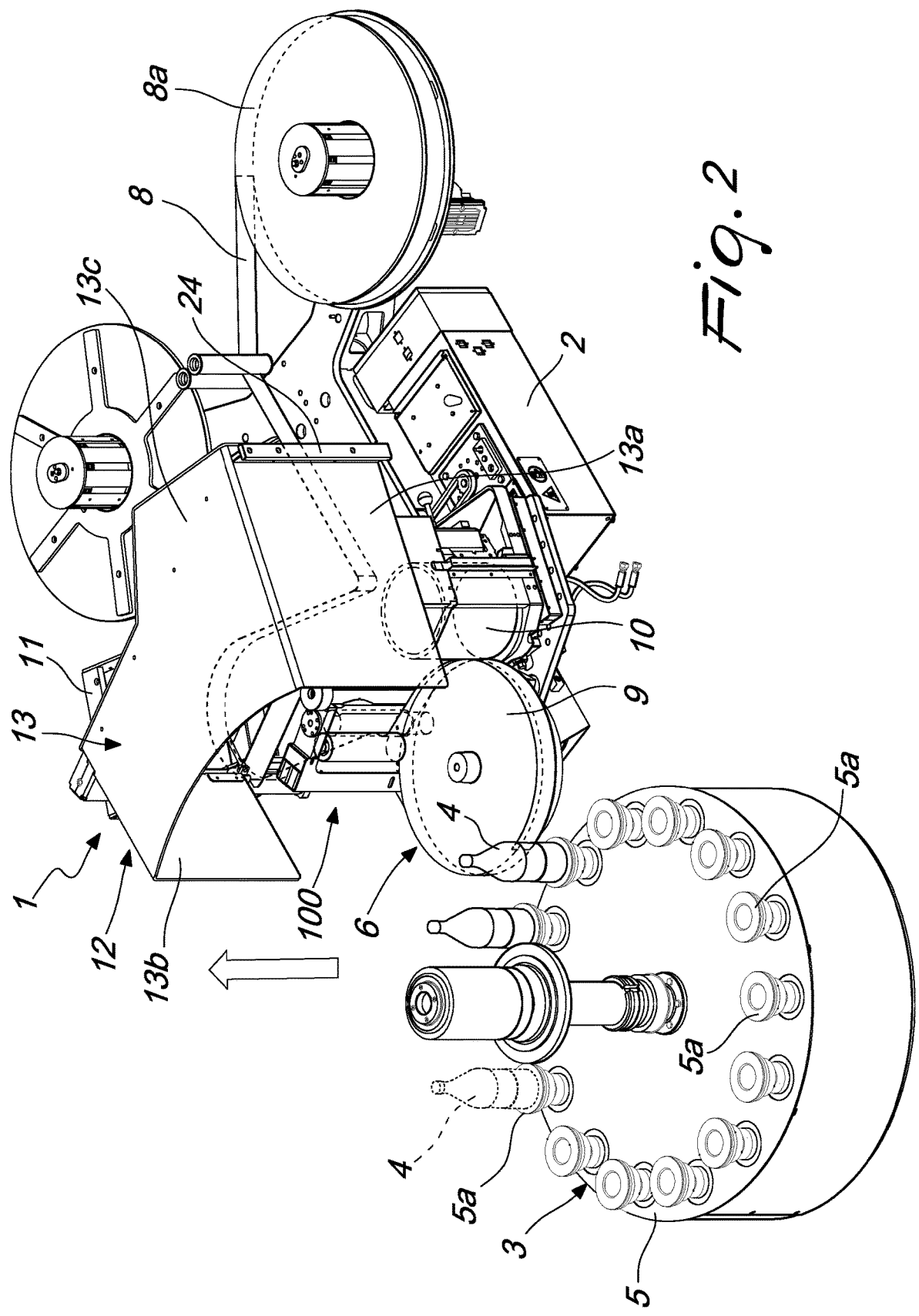
FIG. 2 is a perspective view of the labeling assembly according to the invention, associated with the conveyor of the containers with the protection in a raised position.
Figure 3:
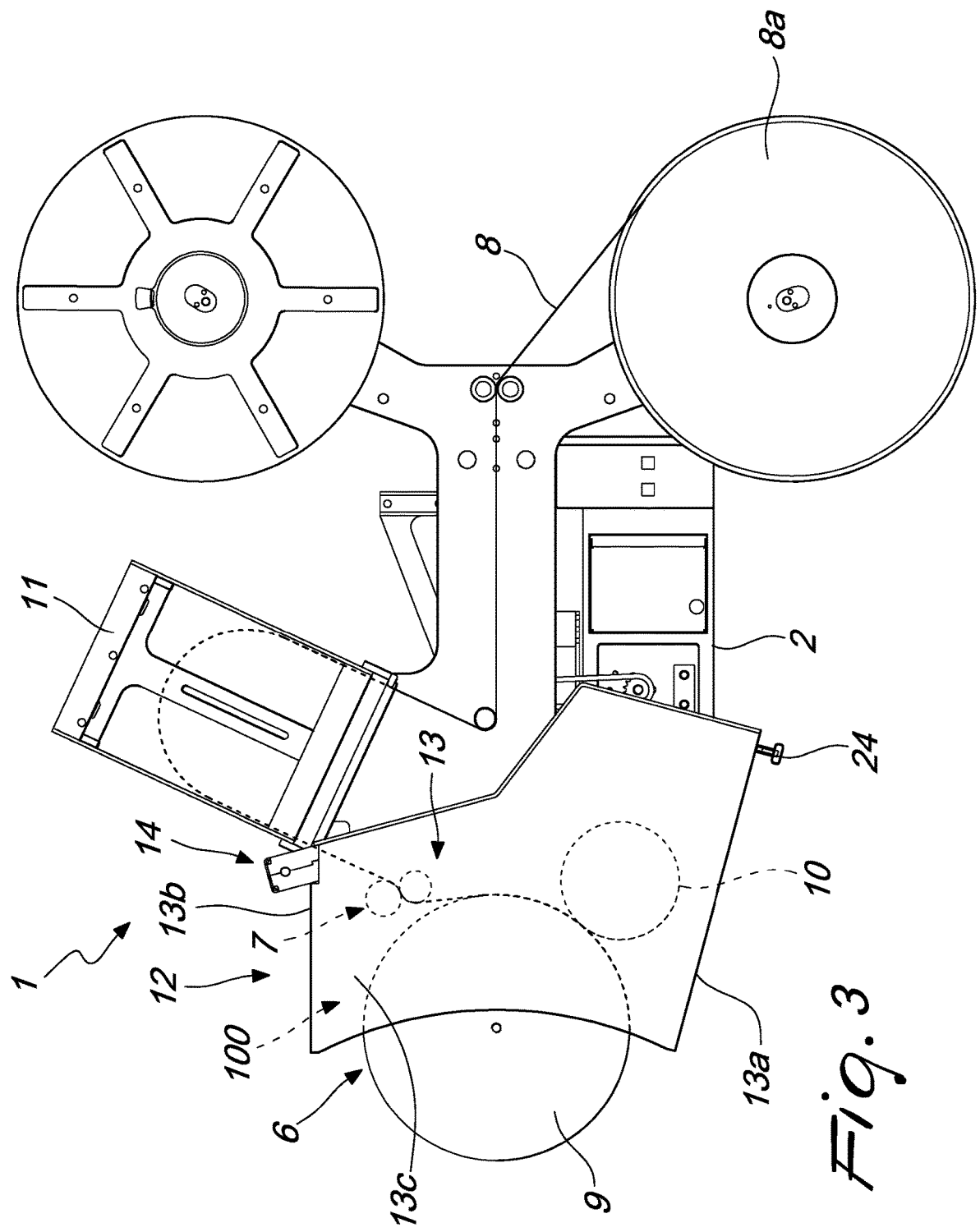
FIG. 3 is a top plan view of the labeling assembly according to the invention with the protection in the active condition.
Figure 4:
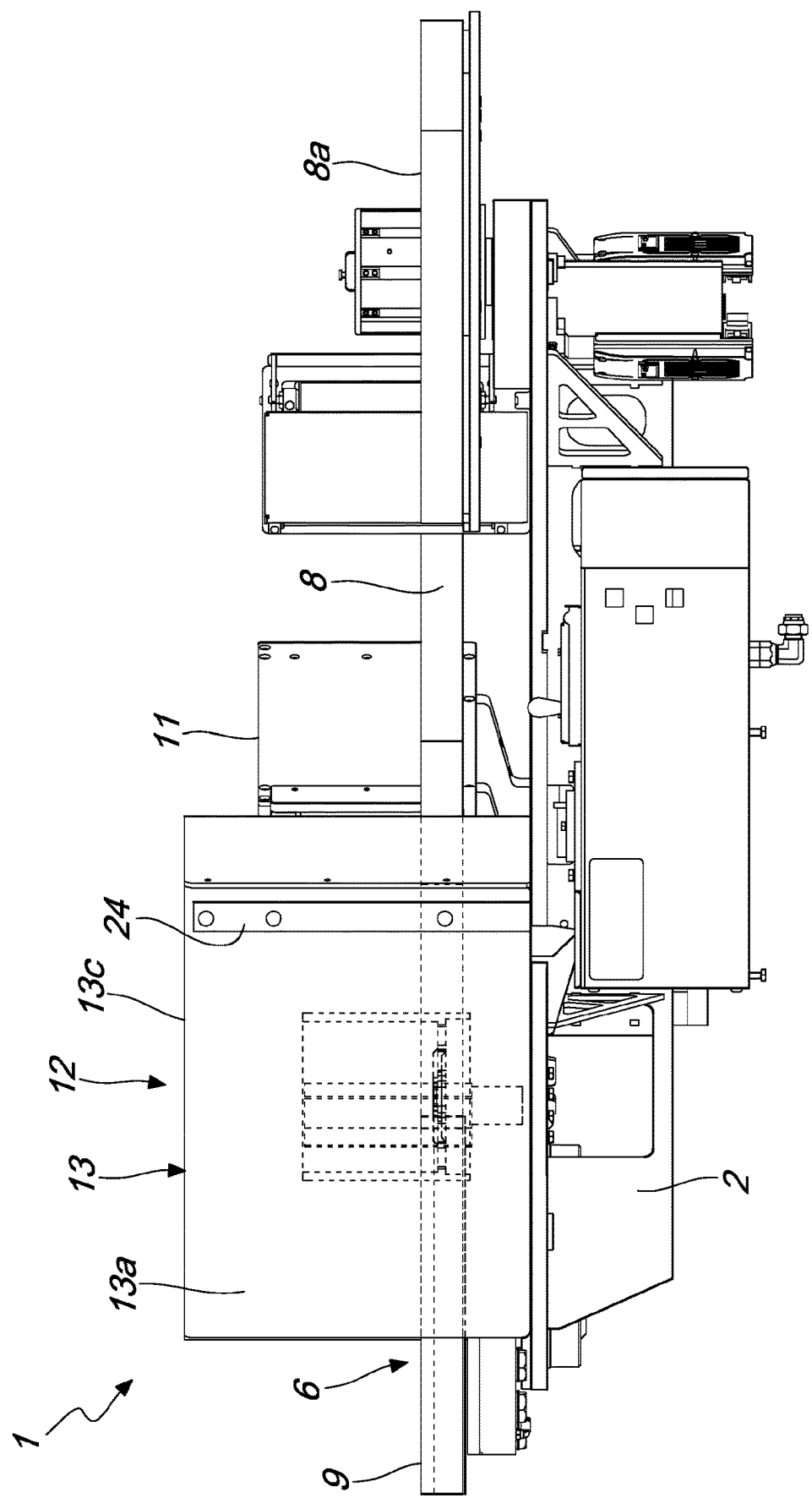
FIG. 4 is a lateral elevation view of the labeling assembly according to the invention with the protection in the active condition.

In this case, the movement means 14 can advantageously comprise at least one linear guide 15, which extends substantially vertically and is slidingly engaged by the protection 12, in order to allow the transition of the protection 12 from a lowered position, with respect to the base framework 2, in which the protection 12 is in practice in the active condition, to a raised position, with respect to the base framework 2, shown in FIG. 2, in which the protection 12 is located above the work area 100.

Conveniently, again in this case, the movement means 14 furthermore comprise means for rotating the protection 12 about a rotation axis that is substantially parallel to the direction of extension of the linear guide 15, said means being advantageously active only following the positioning of the protection 12 in the raised position, so as to allow the transition of the protection 12 between said raised position and a rotated position, which is angularly spaced with respect to the raised position, about said rotation axis, in which the protection 12 is in the inactive condition.

In particular, the linear guide 15 comprises at least one pair of posts 16a, 16b, respectively a first post 16a and a second post 16b, which are telescopically mutually coupled, so that they can slide into each other along the corresponding axes.

Advantageously, the posts 16a, 16b are structured so as to also allow one of the posts 16a, 16b to rotate with respect to the other, about the corresponding axis, at least when the posts 16a, 16b are in a preset position with respect to each other.

More particularly, in the illustrated embodiment, the second post 16b is coupled to the first post 16a by means of the interposition of a third post 16c, which is provided with a guiding groove 17 that is slidingly engaged by at least one abutment element 18, constituted by a tab, which is integral with the other post 16a.

Conveniently, the guiding groove 17 is provided with a longitudinal portion 17a, which extends substantially parallel to the axis of the posts 16a, 16b and can be engaged slidingly by the abutment element 18 during the transition of the protection 12 between the lowered position and the raised position, and a circular portion 17b, which is connected to one end of the longitudinal portion 17a and extends in a circular arc around the axis of the posts 16a, 16b, and in turn can be engaged slidingly by the abutment element 18 during the transition of the protection 12 between the raised position and said rotated position.

In particular, the posts 16a, 16b, 16c are advantageously positioned proximate to or outside of the perimeter of the work area 100 and can be arranged so as to be spaced upward from the base framework 2.

More particularly, one of the posts, in the drawings the second post 16b, is connected to the protection 12, while the first post 16a is in turn connected to the base framework 2, preferably by means of a supporting frame 19 which is constituted for example by a tubular element, which is bent so as to be shaped so as to comprise a vertical portion 19a which extends vertically upward from the base framework 2 and is connected upward to a radial portion 19b, which in turn extends radially with respect to the vertical portion 19a and supports in a cantilever manner the post 16a.

Figures 10, 11:
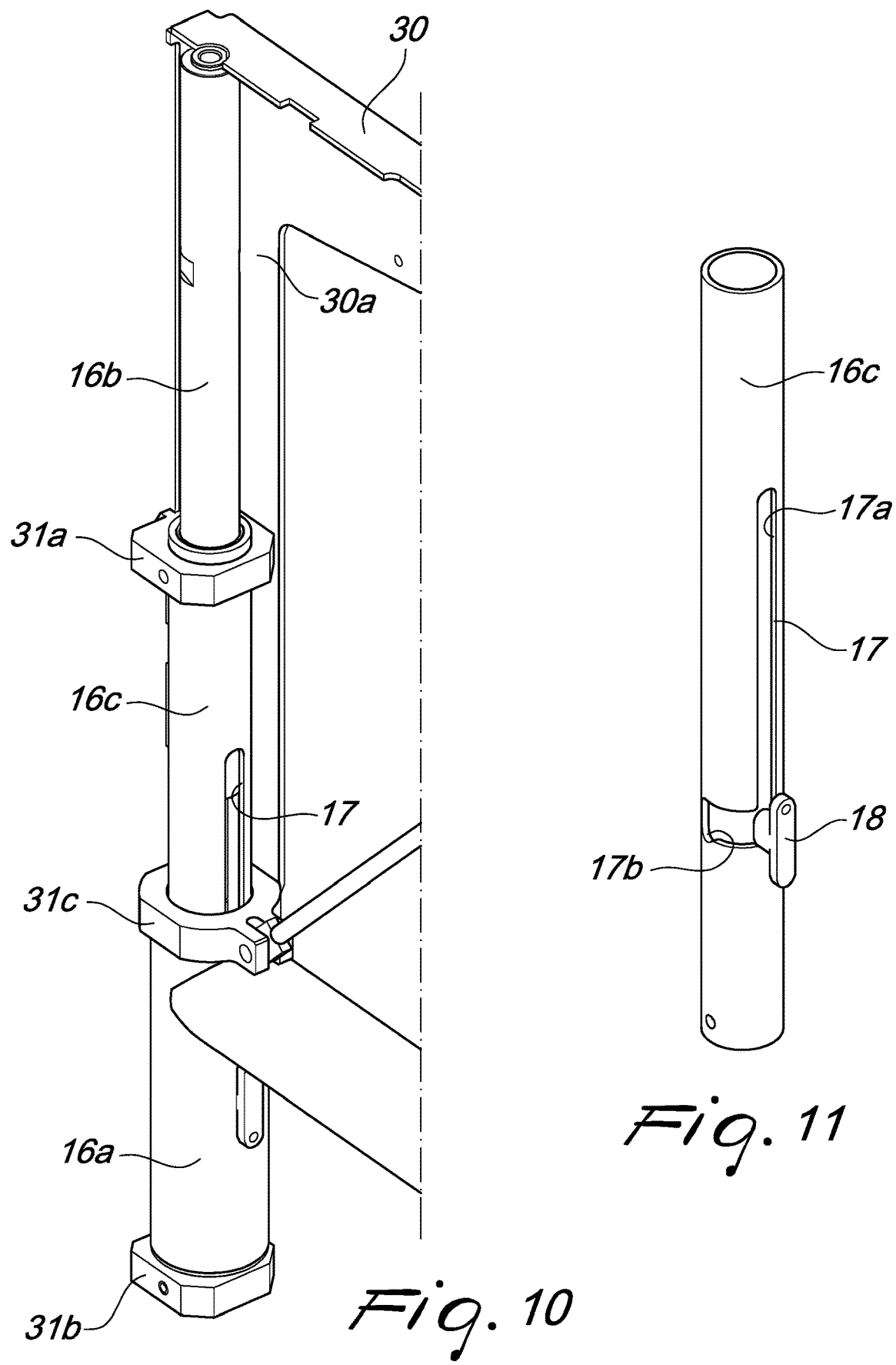
FIG. 10 is a partially cutout perspective view of a detail of the labeling assembly according to the invention.
FIG. 11 is a schematic perspective view of a third post of the protection movement means.

With reference to FIG. 10, it should be noted that the second post 16b is fixed to a support 30, which is for example C-shaped and on which the protection 12 and more particularly the protection body 13 is mounted.

The second post 16b is free to translate axially with respect to the third post 16c, while the support 30 is coupled to the third post 16c with a tubular portion 30a, which is arranged around the posts 16a, 16b, 16c, so as to be integral with the third post 16c in the rotation of the latter with respect to the first post 16a, while having the possibility to translate with respect to the third post 16c integrally with the movement of the second post 16b.

The rotationally integral coupling of the support 30 to the third post 16c is obtained for example by means of a prismatic coupling between the tubular portion 30a and at least one first coupling ring 31a, which is fixed around the third post 16c, preferably at an axial end of the third post 16c.

Also, around the third post 16c it is possible to fix advantageously, to the axial end of the third post 16c that is opposite with respect to the one in which the first coupling ring 31a is fixed, also a second coupling ring 31b, which acts as a further guiding element for the translational motion between the tubular portion 30a and the third post 16c, when the protection is moved from the raised position toward the lowered position.

Advantageously, elastically acting means are provided which are adapted to facilitate the transition of the protection 12 at least between the lowered position and the raised position.

For example, said elastically acting means can comprise at least one first gas-assisted damper 20, which acts between the first post 16a and the second post 16b, at least one second gas-assisted damper 21, which is articulated, at a first end, substantially at the first post 16a and, at a second and, to the protection 12.

More particularly, the first end of the second elastic spring 21 is advantageously hinged to a third coupling ring 31c, which is engaged slidingly by the tubular portion 30a of the support 30 with the possibility to rotate integrally with the support 30, with respect to the first post 16a, against the upper end of which it is kept in resting contact due to the weight of the protection 12 and of the support 30.

Figure 12:
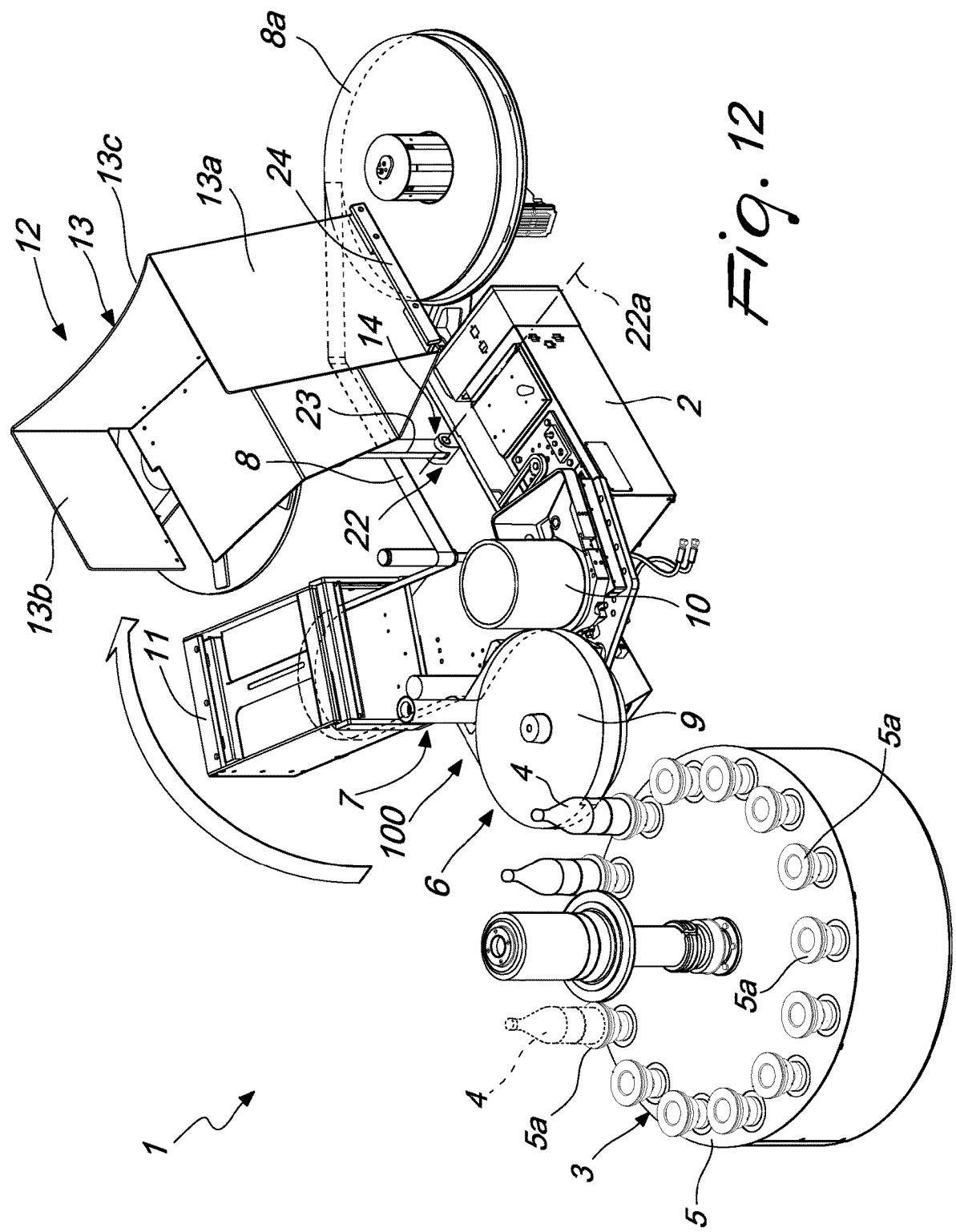
FIG. 12 is a perspective view of the labeling assembly according to the invention associated with the conveyor of the containers in another possible embodiment and with the protection in the inactive condition.

According to another embodiment, shown in FIGS. 12 and 13, the movement means 14 of the protection 12 are constituted by means 22 for pivoting the protection 12 to the base framework 2 about a substantially horizontal tilting axis 22a which is advantageously spaced with respect to the protection 12 and the work area 100 and is arranged on the opposite side with respect to the side of the work area 100 that is designed to be directed toward the conveyor 3.

In particular, said pivoting means 22 comprise at least one oscillation arm 23 which is fixed, at one end, to the protection 12 and is hinged, at its other end, to the base framework 2.

It should be noted that a grip handle 24 might be provided on the protection body 13 in order to allow the operators to move manually the protection 12 between the active condition and the inactive condition.

The operation of the labeling assembly according to the invention is as follows.

With the labeling assembly associated with the conveyor 3 of the containers 4, before starting the operation of the labeling machine, the operator arranges the protection in the active condition, so that the protection body 13 of the protection 12 can delimit the work area 100 of the labeling means 6, so as to prevent the possibility that the operators might dangerously access the work area 100 during the operation of the machine.

Should it be necessary to perform a maintenance, repair or format changing intervention on the labeling means 6, the operator, after stopping the operation of the machine, moves the protection 12 from the active condition to the inactive condition.

To do this, according to the embodiment of FIGS. 1-11, the operator proceeds, with the aid of the grip handle 24, to move the protection 12 first from the lowered position, in which the protection 12 is already arranged, since it is in the active condition, to the raised position, making the protection 12 slide along the linear guide 15, i.e., acting so as to cause the upward sliding of the post 16b with respect to the post 16a, and then from the raised position to the rotated position, by making the protection 12 rotate about the axis of the posts 16a, 16b, so as to arrange the protection 12 in an inactive condition, thus freeing from the space occupation of the protection body 13 of the protection 12 also the portion of space that is located above the work area 100, in order to allow the operators to intervene easily on the labeling means 6 even from above.

Once the necessary interventions on the labeling means 6 have ended, the operator can return the protection 12 to the active condition, performing in reverse the movements performed to bring it to the inactive condition, i.e., by rotating the protection 12 from the rotated position to the raised position and subsequently making the protection 12 slide from the raised position to the lowered position.

With reference to the embodiment of FIGS. 12 and 13, in order to move the protection 12 from the active condition to the inactive condition the operator will simply need to rotate the protection 12 about the tilting axis 22a formed by the hinge means 22, so as to free the access to the work area 100.

The rotation in the opposite direction of the protection 12 about the tilting axis 22a allows the operator to return the protection 12 from the inactive condition to the active condition.

In practice it has been found that the invention achieves the intended aim and objects, and in particular the fact is stressed that the labeling assembly according to the invention allows to arrange the protection provided for the labeling means in a position in which it does not hinder the movement of the operators during the interventions required on the labeling means.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102021000023624 from which this application claims priority are incorporated herein by reference.

The invention claimed is:

1. A labeling assembly for labeling machines, comprising:
a base framework,
means for labeling containers that are carried by a conveyor, said means for labeling being supported by said base framework at a work area,
at least one protection of said work area supported by said base framework, wherein said at least one protection is configured to be moved on command, with respect to said base framework, between an active condition, in which said at least one protection is configured to delimit at least partially said work area, and at least one inactive condition, in which said at least one protection is arranged at least partially outside a portion of space that lies vertically above said work area, in order to allow access to said work area from outside,
wherein said at least one protection is mounted on said base framework by movement means for moving said at least one protection between said active condition and said inactive condition,
wherein said movement means comprise at least one linear guide, which extends substantially vertically from said base framework and is engaged slidingly by said at least one protection, in order to allow a transition of said at least one protection from a lowered position, with respect to said base framework, in which said at least one protection is in said active condition, to a raised position, with respect to said base framework in which said at least one protection is arranged above said work area, said movement means comprising means for a rotation of said at least one protection about a rotation axis that is substantially parallel to the direction of extension of said linear guide, in order to allow a transition of said at least one protection between said raised position and a rotated position, which is angularly spaced with respect to said raised position, about said rotation axis, in which said at least one protection is in said inactive condition.

2. The labeling assembly according to claim 1, wherein said at least one protection comprises a protection body with at least two mutually opposite lateral protection walls configured to delimit respective mutually opposite sides of said work area, with said at least one protection in said active condition.

3. The labeling assembly according to claim 1, further comprising elastically acting means adapted to facilitate the transition of said at least one protection at least between said lowered position and said raised position.

4. The labeling assembly according to claim 1, wherein said at least one linear guide comprises posts which are telescopically coupled to each other and are configured to rotate with respect to each other, at least with said protection in said raised position.

5. The labeling assembly according to claim 4, wherein on at least one of said posts there is at least one guiding groove, which is engaged slidingly by at least one abutment element, which is integral with another one of said posts, and is provided with a longitudinal portion, which extends substantially parallel to an axis of said posts and is configured to be engaged slidingly by said abutment element in the transition of said at least one protection between said lowered position and said raised position, and a circular portion, which is connected to an end of said longitudinal portion and extends in a circular arc around the axis of said posts, said circular portion being slidingly engageable by said abutment element in the transition of said at least one protection between said raised position and said rotated position.

* * * * *